(12) United States Patent
Akiyama

(10) Patent No.: US 7,582,377 B2
(45) Date of Patent: Sep. 1, 2009

(54) FUEL CELL AND METHOD OF ASSEMBLING THE SAME

(75) Inventor: Shiro Akiyama, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 199 days.

(21) Appl. No.: 10/281,219

(22) Filed: Oct. 28, 2002

(65) Prior Publication Data
US 2003/0091873 A1 May 15, 2003

(30) Foreign Application Priority Data
Nov. 15, 2001 (JP) ............................. 2001-349709

(51) Int. Cl.
*H01M 2/00* (2006.01)
*H01M 8/00* (2006.01)
*H01M 2/14* (2006.01)
*H01M 4/86* (2006.01)

(52) U.S. Cl. .............................. 429/34; 429/13; 429/38; 429/40

(58) Field of Classification Search .................. 429/12, 429/38, 34, 13, 40
See application file for complete search history.

(56) References Cited

U.S. PATENT DOCUMENTS

| 5,378,247 | A | 1/1995 | Sasaki et al. |
| 5,478,662 | A | 12/1995 | Strasser |
| 5,937,364 | A | 8/1999 | Westgard et al. |

FOREIGN PATENT DOCUMENTS

| DE | 35 16 765 C2 | 11/1985 |
| DE | 40 09 138 A1 | 3/1990 |
| DE | 43 21 042 C1 | 6/1993 |
| DE | 44 42 285 C1 | 11/1994 |
| DE | 691 25 265 T2 | 3/1997 |
| DE | 196 05 920 A1 | 8/1997 |
| DE | 198 01 117 C1 | 1/1998 |
| JP | 57-208077 | * 12/1982 |

(Continued)

OTHER PUBLICATIONS

German Official Letter dated Apr. 20, 2003 and translation thereof.

(Continued)

*Primary Examiner*—Patrick Ryan
*Assistant Examiner*—Thomas H. Parsons
(74) *Attorney, Agent, or Firm*—Kenyon & Kenyon LLP

(57) ABSTRACT

A pressure loss in an oxidative gas passage of each of single cells is obtained This pressure loss is compared with predetermined ranks so as to carry out classification according to the ranks. The pressure loss in the oxidative gas passage has a predetermined permissible range comprising a first rank, a second rank , . . . , and an n-th rank respectively. The single cell that is to be measured at the moment is classified into a certain one of the ranks depending on which one of the first to n-th ranks corresponds to the pressure loss in the oxidative gas passage. Classification is similarly carried out as to a pressure loss in a fuel gas passage as well. Those of the single cells which are equivalent in rank are gathered up and combined to fabricate a fuel cell.

19 Claims, 5 Drawing Sheets

FOREIGN PATENT DOCUMENTS

| | | |
|---|---|---|
| JP | 63-119166 A | 5/1988 |
| JP | 64-063272 * | 9/1989 |
| JP | 1-320772 * | 12/1989 |
| JP | 04-206361 A | 7/1992 |
| JP | 06-231775 A | 8/1994 |
| JP | 08271414 A | 10/1996 |
| JP | 11-007971 | 1/1999 |
| JP | 11-329460 A | 11/1999 |
| JP | 2000-208161 A | 7/2000 |
| JP | 2001-357869 | 12/2001 |
| WO | WO 96/30718 | 10/1996 |
| WO | WO 00/26983 A1 | 5/2000 |

OTHER PUBLICATIONS

Canadian Office Action. Appln. No. 2,410,190 dated Jun. 15, 2007.

* cited by examiner

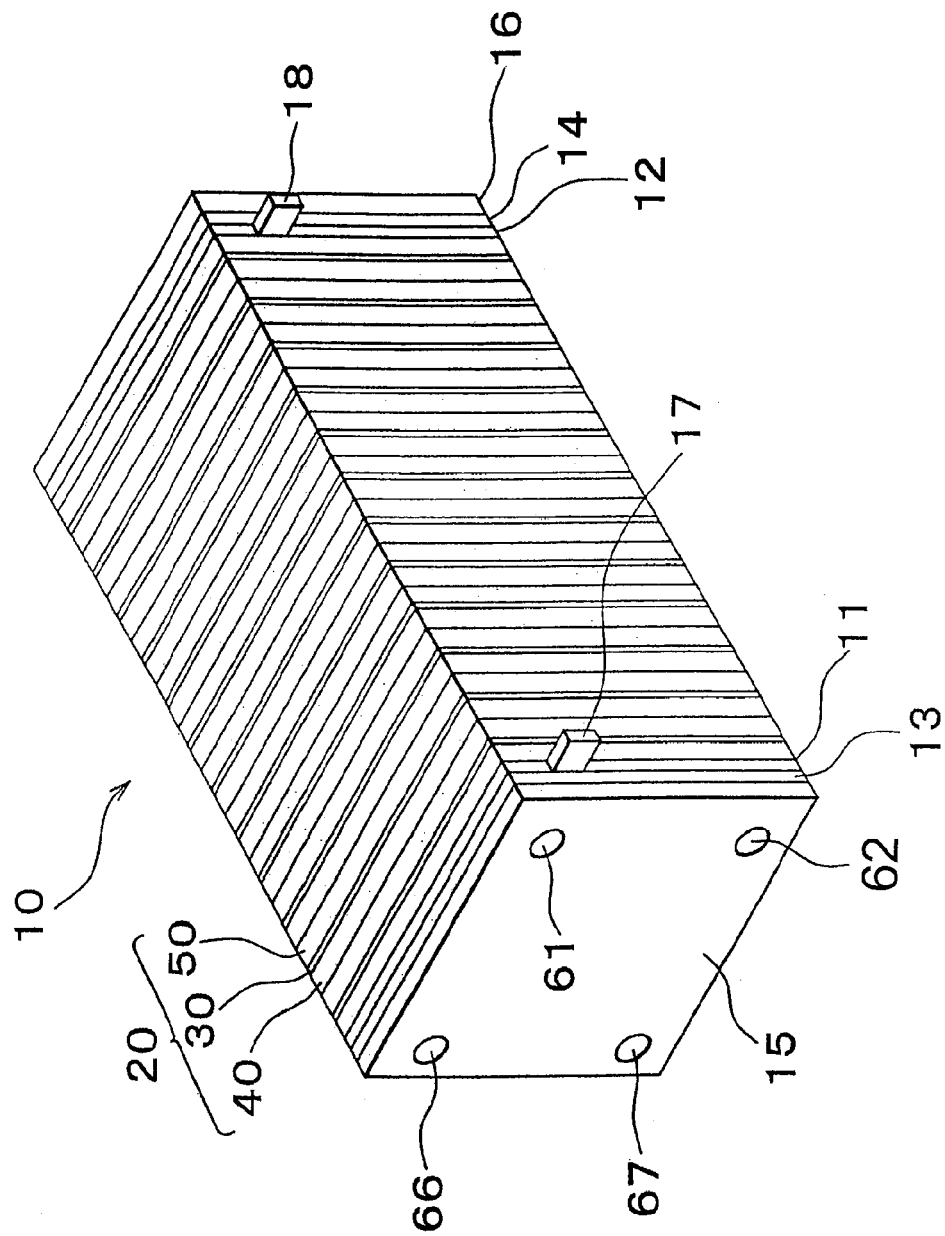

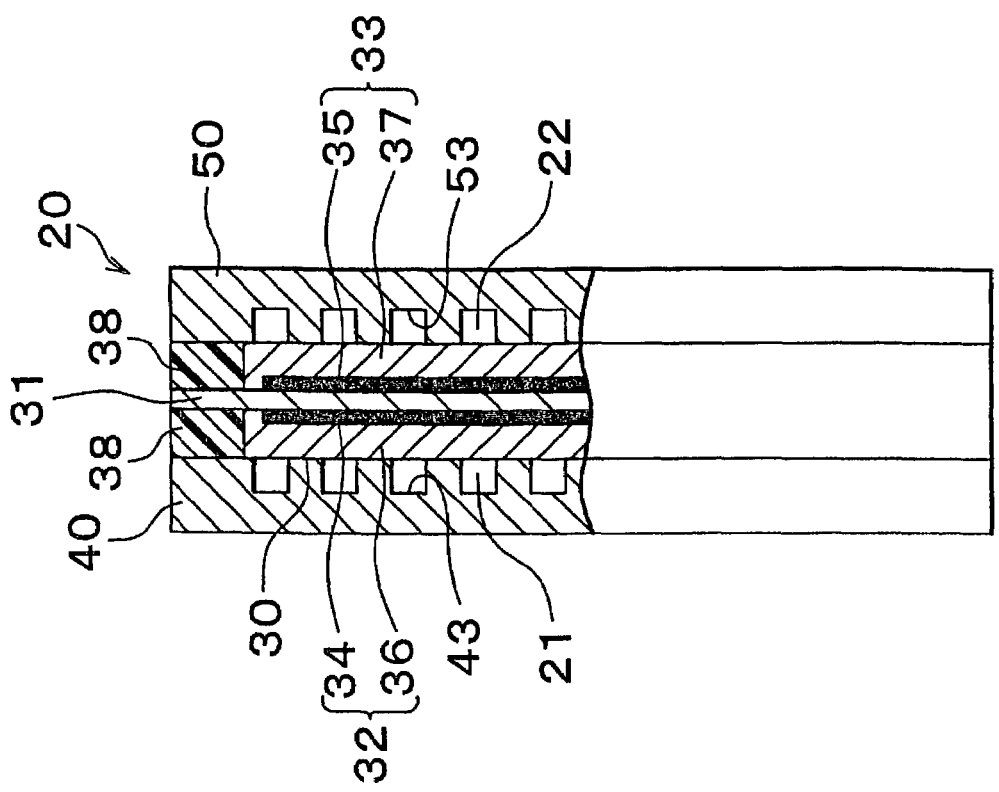
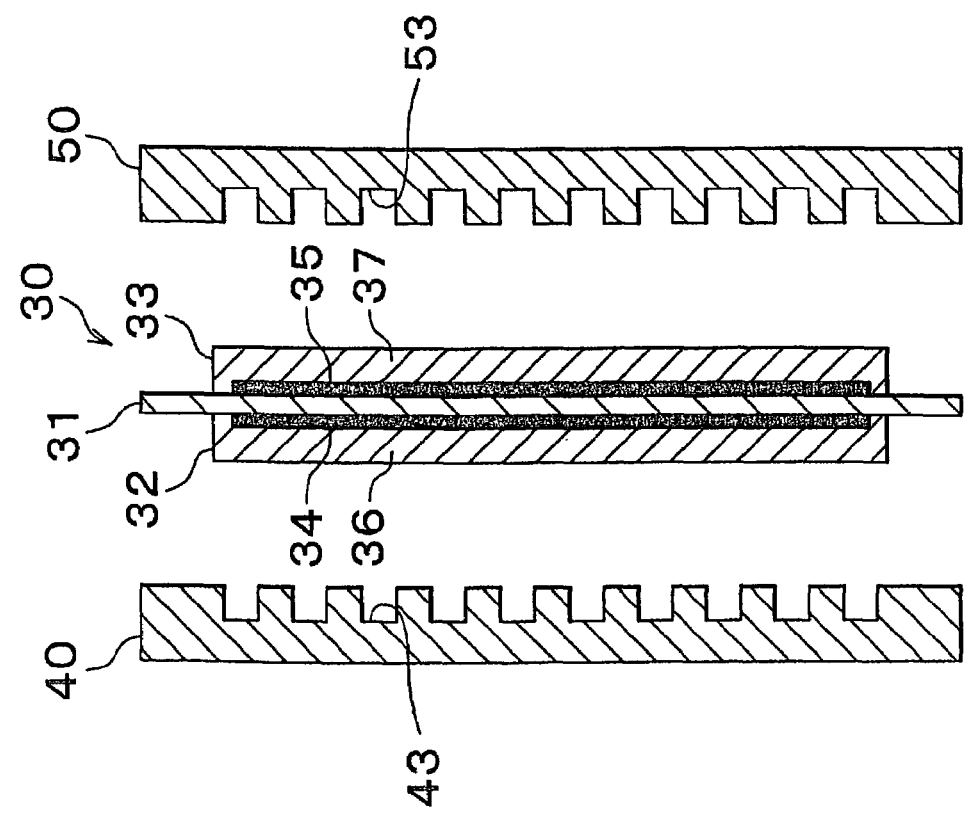

FIG. 4
①MEASUREMENT OF PRESSURE LOSS IN EACH OF SINGLE CELLS
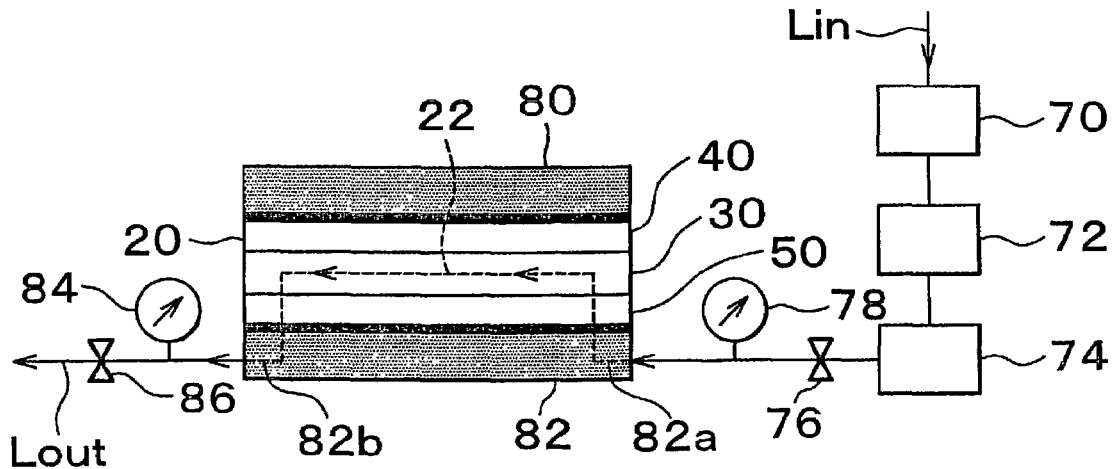
②CLASSIFICATION BASED ON RANKS
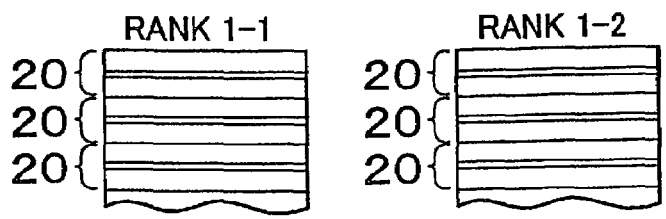
③COMBINING OF SINGLE CELSS

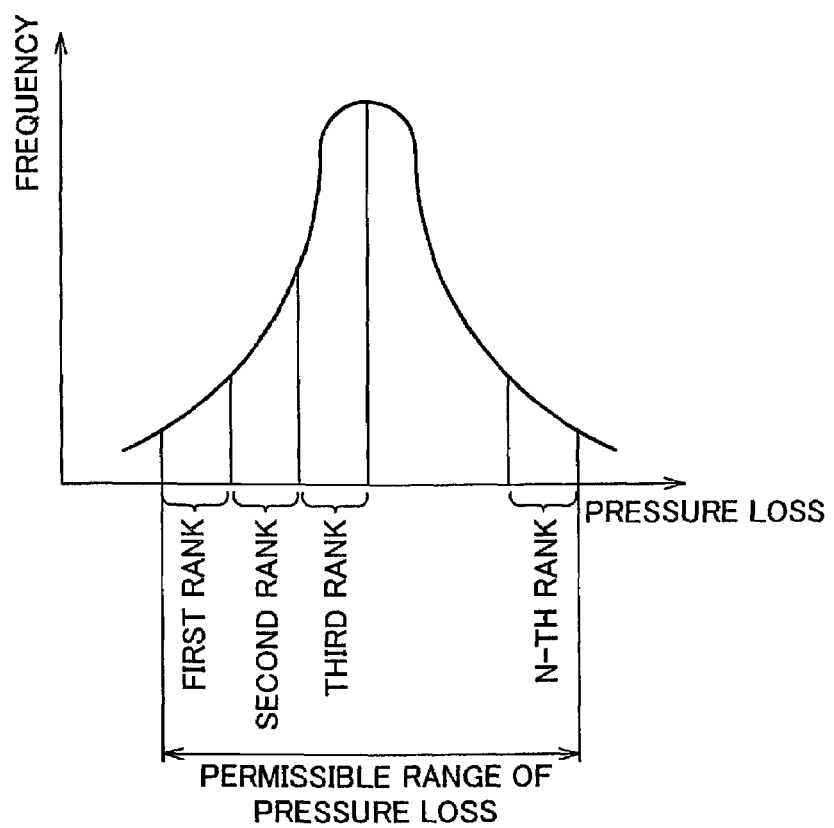

FUEL CELL AND METHOD OF ASSEMBLING THE SAME

INCORPORATION BY REFERENCE

The disclosure of Japanese Patent Application No. 2001-349709 filed on Nov. 15, 2001, including the specification, drawings, and abstract is incorporated herein by reference in its entirety.

BACKGROUND OF THE INVENTION

1. Field of the Invention

The invention relates to a fuel cell and a method of assembling the same.

2. Description of the Related Art

A generally known fuel cell is constructed by laminating a plurality of single cells each having a membrane electrode assembly (hereinafter referred to as the MEA) interposed between two separators. The MEA is composed of an electrolytic membrane and gas diffusion electrodes. Platinum as catalytic electrodes is applied to both surfaces of the electrolytic membrane, which is interposed between the gas diffusion electrodes. The catalytic electrode and the gas diffusion electrode formed on one surface of the MEA constitute an anode, and the catalytic electrode and the gas diffusion electrode formed on the other surface of the MEA constitute a cathode. A fuel gas passage for causing hydrogen gas as fuel gas to spread into a single cell is formed in a separator facing the anode. An oxidative gas passage for causing air as oxidative gas to spread into the single cell is formed in a separator facing the cathode.

If the width of the dispersion of output voltage among single cells constituting a fuel cell is increased, the overall performance of the fuel cell may deteriorate. Thus, as is disclosed in Japanese Patent Laid-Open Application No. 2000-208161, there is an art wherein output voltages of single cells are individually monitored during operational control of a fuel cell, wherein a standard deviation of the output voltages is calculated, and wherein electric current density, reactive gas flow rate, or reactive gas pressure is controlled on the basis of the standard deviation with a view to maintaining high performance of the fuel cell as a whole.

Even if electric current density, reactive gas flow rate, or reactive gas pressure is thus controlled on the basis of a standard deviation of output voltages of single cells, such control alone has its limitations in suppressing the influence of dispersion of output voltage among the single cells.

SUMMARY OF THE INVENTION

It is an object of the invention to provide a fuel cell capable of suppressing the influence of dispersion at the time of manufacture of components thereof. It is another object of the invention to provide a method of assembling such a fuel cell.

A fuel cell in accordance with a first aspect of the invention is obtained by gathering up and combining those components employed in the fuel cell which are substantially equivalent in precision or property at the time of manufacture.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 1 is a perspective view of the overall construction of a fuel cell in accordance with an embodiment of the invention.

FIG. 3A is a cross-sectional view of the overall construction of the single cell that has not been assembled.

FIG. 3B is a cross-sectional view of the overall construction of the single cell that has been assembled.

FIG. 4 is an explanatory view of a procedure that starts with measurement of a pressure loss in each of single cells and that ends with the combining of the single cells.

FIG. 5 is a graph showing a relationship between pressure loss in the single cell and the number of products.

DETAILED DESCRIPTION OF PREFERRED EMBODIMENT

Figure 2A:
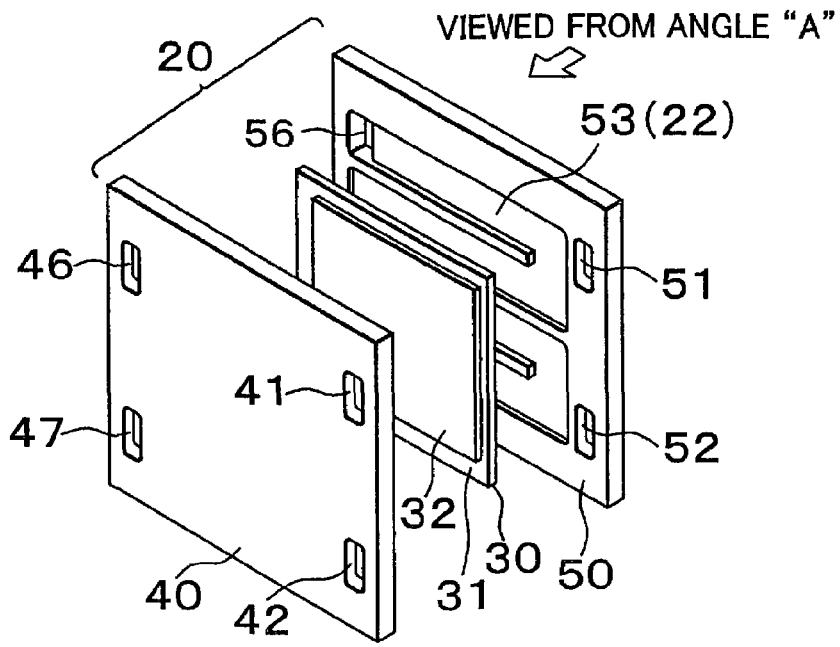
FIG. 2A is an exploded perspective view of a single cell for constituting the fuel cell in accordance with the embodiment of the invention.
Figure 2B:
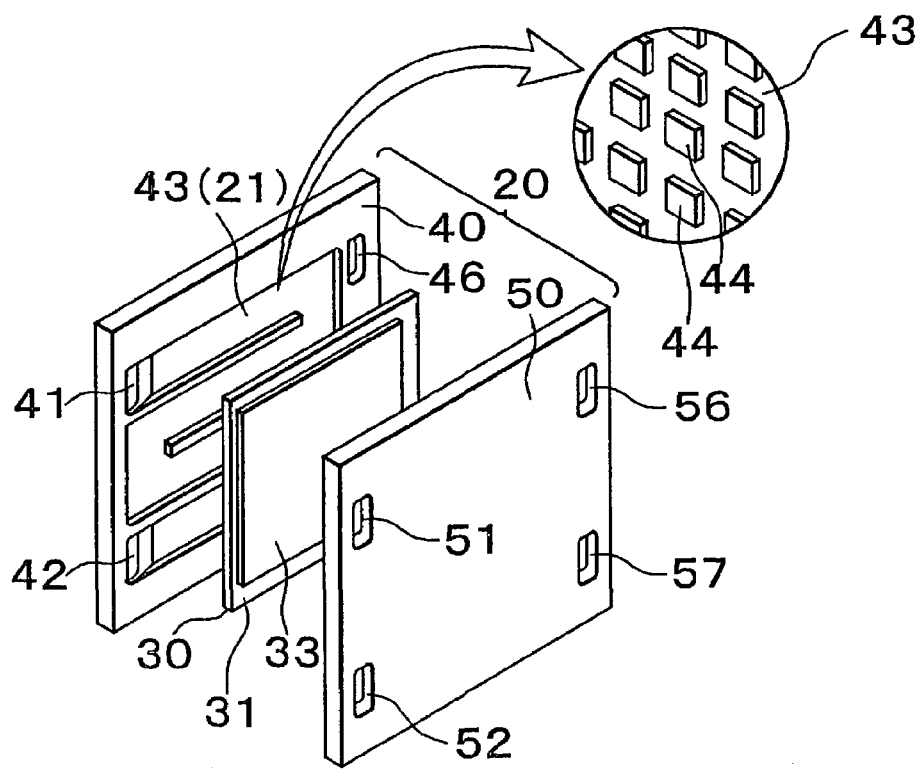
FIG. 2B is an exploded perspective view of the single cell which is designed to constitute the fuel cell in accordance with the embodiment of the invention and which is viewed from an angle indicated by "A" in FIG. 2A.

In order to further clarify the invention, a preferred embodiment of the invention will be described hereinafter with reference to the drawings.

A fuel cell 10 is a solid high-polymer type fuel cell and is mainly constructed of a stack structure, which is obtained by laminating a plurality of single cells 20 as basic units. Each of the single cells 20 has an MEA 30 interposed between a first separator 40 and a second separator 50.

The MEA 30 is a membrane electrode assembly having an electrolytic membrane 31 interposed between an anode 32 and a cathode 33. It is to be noted herein that the electrolytic membrane 31 is a proton-conductive ion-exchange membrane (e.g., a Nafion® membrane manufactured by DuPont®) made of a solid high-polymer material such as fluororesin and exhibits high electric conductivity in a wet state. Platinum or an alloy composed of platinum and another metal is applied to both surfaces of the electrolytic membrane 31, whereby catalytic electrode layers 34, 35 are formed. Gas diffusion electrode layers 36, 37, which are formed of carbon cloth woven from carbon fiber threads, are disposed outside the catalytic electrode layers 34, 35 respectively. The catalytic electrode layer 34 and the gas diffusion electrode layer 36 constitute the anode 32. The catalytic electrode layer 35 and the gas diffusion electrode layer 37 constitute the cathode 33. It is not absolutely required that the gas diffusion electrode layers 36, 37 be formed of carbon cloth. The gas diffusion electrode layers 36, 37 may also be formed of carbon paper or carbon felt made of carbon fiber and are only required to exhibit sufficient gas diffusibility and sufficient conductivity.

Each of the first and second separators 40, 50 is formed of a conductive member impervious to gas, for example, of shaped carbon that has been made impervious to gas by compressing carbon. Hole portions 41, 42 are formed along one of two opposed sides of the first separator 40. Hole portions 46, 47 are formed along the other side of the first separator 40. A crooked concave groove 43 for communication between the hole portions 41, 42 is formed in one surface of the first separator 40 which faces the anode 32 of the MEA 30. The concave groove 43 forms a fuel gas passage 21 in the single cell 20. That is, if fuel gas is supplied from the hole portion 41 in the single cell 20, the fuel gas is discharged from the hole portion 42 through the concave groove 43. It is to be noted herein that a plurality of small protrusions 44 of a predetermined shape protrude from a bottom surface of the concave groove 43. The small protrusions 44 have functions of ensuring sufficient conductivity through contact between their end faces and the gas diffusion electrode layer 36 of the anode 32 and enhancing a gas utilization ratio through diffusion of gas flowing through the fuel gas passage 21 formed by the concave groove 43. On the other hand, hole portions 51, 52 are formed along one of two opposed sides of the second separator 50 as well. Hole portions 56, 57 are formed along the other side of the second separator 50. A crooked concave groove 53 for communication between the hole portions 56, 57 is formed in one surface of the second separator 50 which faces the cathode 33 of the MEA 30. The concave groove 53 forms an oxidative gas passage 22 in the single cell 20. That is, if fuel gas is supplied from the hole portion 56 in the single cell 20, the fuel gas is discharged from the hole portion 57 through the concave groove 53. Although not shown, small protrusions that are substantially the same as those in the concave groove 43 are formed in the concave groove 53. The hole portions 41, 42 of the first separator 40 communicate with the hole portions 51, 52 of the second separator 50 respectively. The hole portions 46, 47 of the first separator 40 communicate with the hole portions 56, 57 of the second separator 50 respectively.

The fuel cell 10 is completed by laminating the single cells 20 and sequentially disposing a collector plate 11, an insulating plate 13, and an end plate 15 on one end and a collector plate 12, an insulating plate 14, and an end plate 16 on the other end. The collector plates 11, 12 are formed of a conductive member impervious to gas, such as compact carbon, a copper plate, or the like. The insulating plates 13, 14 are formed of an insulative member such as rubber, resin, or the like. The end plates 15, 16 are formed of a metal such as rigid steel or the like. The collector plates 11, 12 have output terminals 17, 18 respectively, so that an electromotive force generated in the fuel cell 10 can be output. The end plates 15, 16 pressurize the laminated single cells 20 in the direction of lamination by means of a pressurizing device (not shown) and thus hold them.

In the fuel cell 10 having the laminated single cells 20, the hole portions 41, 51 of each of all the single cells 20 communicate with each other and thus form a fuel gas supply manifold 61. The hole portions 42, 52 of each of all the single cells 20 communicate with each other and thus form a fuel gas discharge manifold. The hole portions 46, 56 of each of all the single cells 20 communicate with each other and thus form an oxidative gas supply manifold 66. The hole portions 47, 57 of each of all the single cells 20 communicate with each other and thus form an oxidative gas discharge manifold 67. It is to be noted herein that a sealing member 38 is disposed in a gap between the first separator 40 and the second separator 50. The sealing member 38 plays roles of preventing fuel gas and oxidative gas from being mixed in that portion and preventing the gases from leaking out to the outside.

When the fuel cell 10 is operated, fuel gas (hydrogen gas in this case) is supplied to the fuel gas supply manifold 61 by means of a control device (not shown), and oxidative gas (compressed air in this case) is supplied to the oxidative gas supply manifold 66 by means of the control device. Then, fuel gas flows through the fuel gas passage 21 of each of the single cells 20 and is discharged to the outside of the fuel cell 10 through the fuel gas discharge manifold 62. Oxidative gas flows through the oxidative gas passage 22 of each of the single cells 20 and is discharged to the outside of the fuel cell 10 through the oxidative gas discharge manifold 67. At this moment, an electromotive force is generated in each of the single cells 20 through an electrochemical reaction. However, since the single cells 20 are connected in series, the sum of electromotive forces in the single cells 20 is equal to an output of the fuel cell 10.

Although not shown in the drawings of the present embodiment, coolant passages through which coolant flows are also formed in the single cells 20. Because the electrochemical reaction that proceeds in the fuel cell 10 is an exothermic reaction, the internal temperature of the fuel cell 10 is maintained in a predetermined temperature range by causing coolant to circulate through the coolant passages.

The fuel cell 10 has a stack structure composed of the laminated single cells 20. It is to be noted herein that all the laminated single cells 20 are obtained by gathering up and combining single cells that are substantially equal in the pressure loss in the fuel gas passage 21 and that are substantially equal in the pressure loss in the oxidative gas passage 22. Although the following description will handle an example of the pressure loss in the oxidative gas passage 22, the same holds true for the pressure loss in the fuel gas passage 21.

FIG. 4 is an explanatory view of a procedure that starts with measurement of a pressure loss in each of the single cells and that ends with the combining of the single cells. In order to measure a pressure loss in the oxidative gas passage 22 of each of the single cells 20, as indicated by an item "(1) measurement of a pressure loss in each of the single cells", a first sealing plate 80 is first brought into close contact with the first separator 40 of each of the single cells 20, so that the hole portions 41, 42, 46, and 47 are closed by the first sealing plate 80. A second sealing plate 82 is brought into close contact with the second separator 50 of the single cell 20, so that the hole portions 51, 52, 56, and 57 are closed by the second sealing plate 82. Each of the sealing plates 80, 82 has a rubber surface that comes into contact with the single cell 20. The rubber surface closes corresponding ones of the hole portions in an airtight manner. Further, the second sealing plate 82 has an introduction hole 82a and an emission hole 82b. The introduction hole 82a extends from a lateral surface of the second sealing plate 82 to a position facing the hole portion 51. The emission hole 82b extends from a position facing the hole portion 52 to a lateral surface of the second sealing plate 82.

A regulator 70 for stabilizing an original pressure, a filter 72 for removing dust from gas, a flow controller 74 for controlling a flow rate, a throttle valve 76 for adjusting the throttle of gas flow, and a first pressure gauge 78 for measuring a pressure of gas supplied to the single cell 20 are installed in a gas supply line Lin connected to the introduction hole 82a. These components are arranged in this order starting from an upstream portion of the gas supply line Lin. On the other hand, a second pressure gauge 84 for measuring a pressure of gas discharged from the single cell 20 and a throttle valve 86 for adjusting the throttle of gas flow are installed in a gas discharge line Lout connected to the emission hole 82b. These components are arranged in this order starting from an upstream portion of the gas discharge line Lout. When measuring a pressure loss, compressed gas is supplied to the gas supply line Lin and the regulator 70 is set at a predetermined original pressure. The flow rate of compressed gas is adjusted by the flow controller 74, and the throttle of compressed gas is adjusted by the throttle valves 76, 86. Then, a value read from the first pressure gauge 78 is regarded as a supply-side gas pressure, and a value read from the second pressure gauge 84 is regarded as a discharge-side gas pressure. A difference between both the gas pressures is calculated and regarded as a pressure loss, which is then classified into a certain one of predetermined ranks.

Before explaining classification based on the ranks, a method of determining the ranks will be described. FIG. 5 is a graph showing a relationship between pressure loss in each of the single cells and the number of products. As shown in FIG. 5, the pressure loss in the oxidative gas passage 22 has a predetermined permissible range. If it is assumed that the axis of abscissa represents pressure loss and that the axis of ordinate represents frequency (the number of products), a substantially normal distribution is obtained. This permissible range is divided into two or more small ranges, to which a first rank, a second rank, . . . , and an n-th rank is assigned respectively. The first rank is defined as a range with a minimum pressure loss, that is, a range with a minimum resistance against gas flow. As the ordinal number of rank increases, the pressure loss is gradually increased. The n-th rank is defined as a range with a maximum pressure loss, that is, a range with a maximum resistance against gas flow. In classification based on the ranks, the small ranges may be determined by dividing the permissible range either evenly or unevenly.

The pressure loss in the oxidative gas passage 22 in the single cell 20 is dispersed presumably because the oxidative gas passage 22 slightly differs in volume or internal shape among the products. Such a slight difference is presumably ascribable to the fact that the precision in forming the concave groove 53 of the separator 50 or the precision in forming the small protrusions protruding from the concave groove 53 differs among the products, that the electrolytic membrane 31, the catalytic electrode layer 35, or the gas diffusion electrode layer 37 of the MEA 30 differs in thickness or density among the products, or that the amount of the sealing member 38 used in bonding the first and second separators 40, 50 together differs among the products.

Classification based on the ranks is carried out as follows. That is, the oxidative gas passage 22 of the single cell 20 that is to be measured at the moment is classified into a certain one of the ranks depending on which one of the first to n-th ranks corresponds to a pressure loss in the oxidative gas passage 22. Similarly, the fuel gas passage 21 of the single cell 20 that is to be measured at the moment is classified into a certain one of the ranks depending on which one of the first to n-th ranks corresponds to a pressure loss in the fuel gas passage 21. Then, a corresponding position of the single cell 20 to be measured at the moment in a table shown in an item "(2) classification based on the ranks" in FIG. 4, that is, in a table representing the ranks of the oxidative gas passage 22 and the fuel gas passage 21 is recorded. For instance, if the pressure loss in the oxidative gas passage 22 corresponds to the first rank and the pressure loss in the fuel gas passage 21 corresponds to the second rank, the position of the single cell 20 is recorded as "rank 1-2" in the table.

After the position of each of the single cells 20 has been recorded as "rank O–O" (O represents an integer equal to or larger than 1) in the table, the single cells 20 belonging to the same rank are gathered up and combined so as to fabricate the fuel cell 10, as is apparent from an item "(3) the combining of the single cells" in FIG. 4. For instance, the single cells 20 belonging to "rank 1-1" are gathered up and combined, or the single cells 20 belonging to "rank 1-2" are gathered up and combined. As a result, the fuel cell 10 thus obtained is substantially equal in the pressure loss in the oxidative gas passage 22. Hence, oxidative gas that has been supplied from the oxidative gas supply manifold 66 flows through the oxidative gas passage 22 of any one of the single cells 20 constituting the fuel cell 10 at a substantially equal flow rate. Further, since the fuel cell 10 is substantially equal in the pressure loss in the fuel gas passage 21, fuel gas that has been supplied from the fuel gas supply manifold 61 flows through the fuel gas passage 21 of any one of the single cells 20 constituting the fuel cell 10 at a substantially equal flow rate. Accordingly, an electrochemical reaction occurs substantially in the same manner and a substantially equal output voltage is generated in any one of the single cells 20.

According to the fuel cell 10 of the present embodiment that has been described above in detail, the width of the dispersion of property of the single cells 20 as a plurality of constituents employed in the fuel cell 10, that is, the width of the dispersion of the pressure loss in the gas passages 21, 22 is reduced. Hence, the influence of such dispersion can be suppressed, and excellent performance is achieved as the fuel cell 10. For instance, if the pressure losses in the single cells 20 are widely dispersed, the single cells 20 having desirable pressure losses and the single cells 20 having almost unacceptable pressure losses are jumbled up in the single fuel cell 10. It is difficult to simultaneously perform controls suited for the single cells 20 of these two different types. However, if the pressure losses are narrowly dispersed as in the case of the present embodiment, the single fuel cell 10 contains only the single cells 20 that are substantially equal in pressure loss. Thus, all that has to be done is to perform a control suited for the single cells 20 of this unique type. Consequently, the control stability as the fuel cell 10 is increased.

Further, since classification based on the ranks is carried out according to the two or more ranges constituting the predetermined permissible range, any one of the single cells 20 whose precision or characteristic value is out of the permissible range is excluded. It is to be noted, however, that the permissible range of the pressure loss in each of the gas passages 21, 22 in the aforementioned embodiment may be wider than the permissible range in the case of the related art in which classification based on ranks is not carried out. That is, if classification based on ranks is carried out, the width of the dispersion of the pressure loss in each of the gas passages 21, 22 is reduced, and as a result, the control stability as the fuel cell 10 is increased. Hence, even if a range regarded as impermissible according to the related art has been incorporated into the permissible range, there is little chance of an obstacle being caused in practical situations.

It is incontrovertibly obvious that the invention is not limited to the aforementioned embodiment and that the invention can be implemented in various modes as long as they belong to the technical scope of the invention.

For instance, in the case where highly pure hydrogen gas is supplied as fuel gas in an excessive amount far exceeding an amount required for an electrochemical reaction in the aforementioned embodiment, if it is assumed that the single cells 20 having small pressure losses in the fuel gas passage 21 and the single cells 20 having great pressure losses in the fuel gas passage 21 have been jumbled up and laminated to fabricate the fuel cell 10, fuel gas flows at a smaller flow rate through the fuel gas passage 21 of each of the single cells 20 having great pressure losses than through the fuel gas passage 21 of each of the single cells 20 having small pressure losses. Nonetheless, the amount of hydrogen supplied is excessive and thus may satisfy the requirement of the electrochemical reaction. In such a case, it is not strictly necessary to take the dispersion of pressure loss in the fuel gas passage 21 into account. It is not absolutely required that the single cells 20 that are substantially equal in the pressure loss in the fuel gas passage 21 be gathered up and combined. Thus, it is also appropriate to determine whether or not the dispersion of pressure loss in the fuel gas passage 21 is to be taken into account, depending on the amount of fuel gas supplied. The same holds true for oxidative gas.

In the aforementioned embodiment, the single cells 20 that are substantially equal both in the pressure loss in the oxidative gas passage 22 and in the pressure loss in the fuel gas passage 21 are gathered up and combined to fabricate the fuel cell 10. However, it is also appropriate that the single cells 20 that are substantially equal only in the pressure loss in the oxidative gas passage 22 or only in the pressure loss in the fuel gas passage 21 be gathered up and combined to fabricate the fuel cell 10.

Further, although the single cells 20 that are substantially equal in the pressure loss in the each of the gas passages 21, 22 are gathered up and combined to fabricate the fuel cell 10 in the aforementioned embodiment, it is also appropriate that the single cells 20 that are substantially equal in output voltage be gathered up and combined to fabricate the fuel cell 10. In this case, the dispersion of output voltage among the single cells 20 is suppressed, and excellent performance is achieved as the fuel cell 10. In measuring an output voltage of each of the single cells 20, it is preferred that measurement be carried out with conditions such as electric current density, gas flow rate, and the like remaining unchanged. Alternatively, it is also appropriate that the single cells 20 that are substantially equivalent in IV property (property representative of a relationship between electric current density and output voltage) be gathered up and combined to fabricate the fuel cell 10. In this case, the dispersion of IV property among the single cells is suppressed, and excellent performance is achieved as the fuel cell 10. Alternatively, it is also appropriate that the single cells 20 each including the first separator 40 having the concave groove 43 formed with a substantially equal manufacturing precision and the second separator 50 having the concave groove 53 formed with a substantially equal manufacturing precision be gathered up and combined to fabricate the fuel cell 10. In this case, the width of the dispersion of the manufacturing precision of the concave groove 43 formed in the first separator 40 or the concave groove 53 formed in the second separator 50 is reduced. Hence, the width of the dispersion of shape, volume, or the like of each the gas passages 21, 22 among the single cells 20 is reduced as well. As a result, the width of the dispersion of pressure loss or output voltage also tends to be reduced. Alternatively, it is also appropriate that the single cells 20 that are substantially equivalent in the manufacturing precision or the property of the MEA 30 be gathered up and combined to fabricate the fuel cell 10.

Furthermore, in the aforementioned embodiment, it is also appropriate that the single cells that are substantially equivalent in the precision or property of the gas diffusion electrode layers 36, 37 employed in the fuel cell 10 at the time of manufacture be gathered up and combined. In this case, it is preferred that the single cells 20 that are substantially equivalent in the precision or property of the gas diffusion electrode layer 36 on the side of the anode 32 or the single cells 20 that are substantially equivalent in the precision or property of the gas diffusion electrode layer 37 on the side of the cathode 33 be gathered up and combined. The gas diffusion electrode layer may be different in required precision or required property depending on the function thereof (i.e., depending on whether the gas diffusion electrode layer is on the anode side or on the cathode side). Hence, it is preferred that the single cells that are substantially equivalent in precision or property as to each of the functionally equivalent gas diffusion electrode layers be gathered up and combined.

If the components employed in the fuel cell are widely dispersed in precision or property, some of the components are highly desirable in terms of precision or property, whereas the other components are almost unacceptable. Thus, it is difficult to simultaneously perform controls suited for the components of these two different types. However, as is apparent from the aforementioned embodiment, if the components that are narrowly dispersed in precision or property are combined to be employed in the fuel cell, the fuel cell contains only the components that are substantially equivalent in precision or property. Therefore, all that has to be done is to perform a control suited for the components of this unique type, and the control stability as the fuel cell is increased. Thus, excellent performance is achieved as the fuel cell.

What is claimed is:

1. A method of assembling a fuel cell stack, comprising:
classifying single cells, which are multiple single cells, in one of a first rank of first single cells and a second rank of second single cells;
measuring a pressure loss in gas passages of each of the first and second single cells, wherein the pressure losses in the gas passages of the first single cells classified into the first rank are lower than the pressure losses in the gas passages of the second single cells classified into the second rank;
subdividing the single cells of the first and second ranks to fall within a predetermined allowable tolerance/permissible range;
the pressure losses in the gas passages of each first single cell in the first rank are substantially equal;
the pressure losses in the gas passages of each second single cell in the second rank are substantially equal;
selecting only the first single cells or the second single cells; and
assembling the fuel cell stack with only the first single cells or the second single cells.

2. The method of assembling a fuel cell stack according to claim 1, wherein:
components that are substantially uniform in a precision or property that affects fuel cell stack performance, wherein the components are selected from a plurality of components that vary in the precision or property within a predetermined allowable tolerance.

3. The method of assembling a fuel cell stack according to claim 2, wherein the components are classified into two or more ranks that correspond to two or more ranges within the predetermined allowable tolerance.

4. The method of assembling a fuel cell stack according to claim 2, wherein the property is an output voltage of each of the single cells.

5. The method of assembling a fuel cell stack according to claim 2, wherein the components are at least one of membrane electrode assemblies, separators, gas diffusion electrode layers, catalytic electrode layers, and electrolytic membranes.

6. The method of assembling a fuel cell stack according to claim 2, wherein the components are separators, and the precision is a manufacturing precision of a groove provided to form a gas passage of each of single cells.

7. A method of assembling a fuel cell stack, comprising:
classifying single components into one of a first rank and a second rank, wherein multiple single components of one of said first and second ranks are substantially uniform in precision or property that affect fuel stack performance;
the precision or property of the single components classified into the first rank is different from the precision or property of the single components classified into the second rank;

the precision or property of the single components in the first rank are substantially equal;

the precision or property of the single components in the second rank are substantially equal;

subdividing the first and second ranks to fall within a predetermined allowable tolerance/permissible range; and selecting only the first single components or the second single components; and assembling the fuel cell stack with only the first single components or the second single components.

8. The method of assembling a fuel cell stack according to claim 7, wherein the precision or property of the components in the first rank are substantially equal at the time of manufacture; and the precision or property of the components in the second rank are substantially equal at the time of manufacture.

9. The method of assembling a fuel cell stack according to claim 7, wherein the components are fuels cells.

10. The method of assembling a fuel cell stack according to claim 9, wherein the property of the components is a pressure loss in a gas passage provided in the fuel cell.

11. The method of assembling a fuel cell stack according to claim 10, wherein the gas passage is an oxidative gas passage or a fuel gas passage.

12. The method of assembling a fuel cell stack according to claim 9, wherein the property of the components is an output voltage of each of fuel cells.

13. The method of assembling a fuel cell stack according to claim 7, wherein the components are separators, and the precision is a manufacturing precision of groove provide to form a gas passage of each of the single cells.

14. The method of assembling a fuel cell stack according to claim 7, wherein the components are at least one of membrane electrode assemblies, separators, gas diffusion electrode layers, catalytic electrode layers, and electrolytic membranes.

15. A method of assembling a fuel cell stack, comprising:

measuring a pressure loss in gas passages of single cells which are multiple single cells; and classifying the single cells in one of a first position and a second position within a matrix of ranking with respect to the measured pressure loss in the gas passage of each fuel cell, wherein pressure losses in the gas passages of each first single cell classified into the first position is lower than the pressure losses in the gas passages of each second single cell classified into the second position;

the pressure losses in the gas passages of each first single cell in the first position are substantially equal;

the pressure losses in the gas passages of each second single cell in the second position are substantially equal;

subdividing the first and second positions to fall within a predetermined allowable tolerance/permissible range; and selecting only the first single cells or the second single cells; and assembling the fuel cell stack with only the first single cells or the second single cells.

16. A method of assembling a fuel cell, comprising:

measuring deviation in a precision or property that affects fuel cell performance of components included in single cells which are employed in the fuel cell, which are electrically connected to each other in series, the measuring including for each of a plurality of single cells before assembly into a fuel cell, sealing the single cell in an airtight manner;

supplying a gas to the single cell by way of an introduction hole;

determining a pressure loss in the single cell;

forming a matrix of rankings with respect to pressure loss for the plurality of single cells, a position within the matrix describing pressure loss respectively, for a fuel gas passage versus an oxidative gas passage of each single cell; and assembling a fuel cell using single fuel cells assigned a same position within the matrix.

17. The method according to claim 16, wherein the property is an output voltage of each of the single cells.

18. The method according to claim 16, wherein the components are at least one of membrane electrode assemblies, separators, gas diffusion electrode layers, catalytic electrode layers, and electrolytic membranes.

19. The method according to claim 16, wherein the precision is a manufacturing precision of a groove provided to form a gas passage of each of the single cells.

* * * * *

UNITED STATES PATENT AND TRADEMARK OFFICE
CERTIFICATE OF CORRECTION

PATENT NO.      : 7,582,377 B2                                                     Page 1 of 1
APPLICATION NO. : 10/281219
DATED           : September 1, 2009
INVENTOR(S)     : Shiro Akiyama It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 281 days.

Signed and Sealed this

Fourteenth Day of September, 2010

David J. Kappos
*Director of the United States Patent and Trademark Office*